United States Patent [19]

Garboli et al.

[11] Patent Number: 5,165,498
[45] Date of Patent: Nov. 24, 1992

[54] ELECTROMECHANICAL DEVICE TRIPPED BY A TRIGGER BOX FOR BOTH AUTOMATIC AND MANUAL QUICK-RELEASE FOR MOTORCARS SAFETY BELTS

[76] Inventors: Ottorino Garboli, c/o Studio Tecnico Geom.Pietro Valpreda Via Dello Stadio 6; Pietro Valpreda, Via dello Stadio 6; Giorgio Garboli, c/o Studio tecnico Geom. Pietro Valpreda Via dello Stadio 6, all of 31029 Vittorio Veneto (TV), Italy

[21] Appl. No.: 666,603

[22] Filed: Mar. 8, 1991

[30] Foreign Application Priority Data

Mar. 13, 1990 [IT] Italy ................................ 82537 A/90

[51] Int. Cl.$^5$ ............................................. B60R 21/00
[52] U.S. Cl. ............................................. 180/268; 180/270; 280/801
[58] Field of Search ................ 180/268, 269, 270; 280/801

[56] References Cited

U.S. PATENT DOCUMENTS

| | | | |
|---|---|---|---|
| 3,963,090 | 6/1976 | Hollins | 180/268 |
| 4,553,625 | 11/1985 | Tsuge et al. | 180/268 |
| 4,742,886 | 5/1988 | Sato | 180/268 |

FOREIGN PATENT DOCUMENTS

| | | | |
|---|---|---|---|
| 49527 | 4/1977 | Japan | 180/268 |
| 247149 | 10/1988 | Japan | 180/268 |

*Primary Examiner*—Kenneth R. Rice
*Attorney, Agent, or Firm*—Edmund M. Jaskiewicz

[57] ABSTRACT

A special restrained size device, with a gear reduction unit including a pilot motor and a series of Kinematisms, basically made of a train of toothed wheels, connected according to a scheme suitable for a trigger box being charged both by the car battery and by another small standby battery sheltered inside the car passenger compartment. The trigger box is planned to transmit a small electronic timer the impulse for the automatic safety belts quick-release some seconds (6–8) after a violent car crash and consequent motor stop. The safety belts quick-release can be obtained manually. The special structure of the whole of this mechanical device was conceived in order to connect it, through easy fitment and without considerable cost, with all the current best market-licensed safety belts.

The main purpose of this invention lies in performing, by using common and low cost means and materials, a good vehicle safety belt with electronic quick-release, which, in case of serious car accident, will prove really important in saving a lot of human lives.

5 Claims, 4 Drawing Sheets

ELECTROMECHANICAL DEVICE TRIPPED BY A TRIGGER BOX FOR BOTH AUTOMATIC AND MANUAL QUICK-RELEASE FOR MOTORCARS SAFETY BELTS

This invention relates to a new safety belt both for the driver and for the passengers.

Many sorts of safety belts are nowadays marketed but all show a clear design error: no safety belts is provided with an automatic quick-release. Everyday on the roads of the world thousands of people die owing to fatal car accidents. Of course, all these lives might be saved if the belt locking them tight to their seats, would be released automatically right some seconds after the vehicle crash: apart from the victim's will or impossibility, due to a sudden lack of conscience. In some cases, for instance, because of a fire, the succorers' help would be easier, quicker and vital for taking the blessed people out of the car compartment. The same result would be achieved after the vehicle fall into the waters of a canal, a lake and so on.

This electronic safety belt with automatic quick-release is not like some sort of de luxe accessory people buy to make theirown car nicer to see, but it must be regarded as something that gives your life safety and protection.

The electromechanical device tripped by a trigger box for the automatic safety belts quick-release in question, is therefore an integrating and completing part of the gear contained in most coupling buckle produced and sold on the market.

Construction size and shape were reduced to the minimum possible scale, so that the new box-shaped shell of the buckle shows absolutely compact, avoiding any connection and assembling problem.

Further features and advantages of this invention will appear in the detailed specification that follows, referring to the attached drawings, to be considered as a non-restrictive example, wherein.

Figure 1:
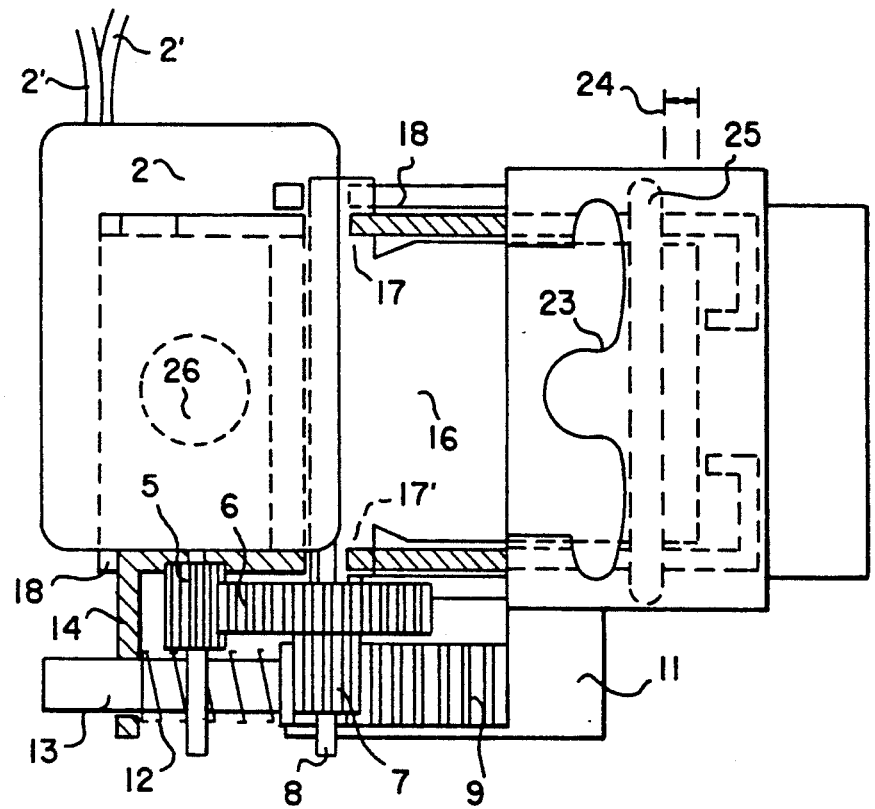
FIG. 1 is an upper view of the whole electromechanical device Kinematisms mounted on market-licensed coupling buckle.
Figure 2:
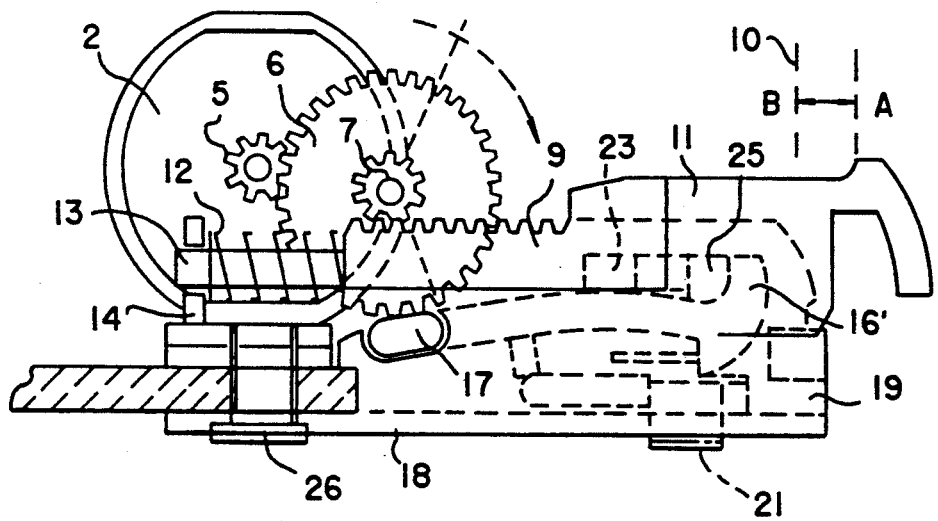
FIG. 2 is a side view of the whole gear of the electronic device.
Figure 3:
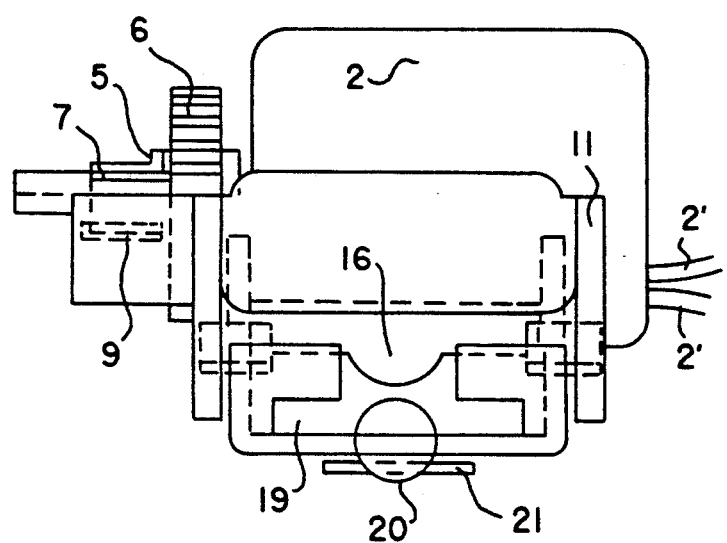
FIG. 3 is a front view of the same device.
Figure 6:
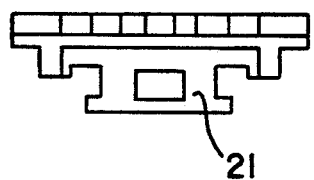
Figure 7:
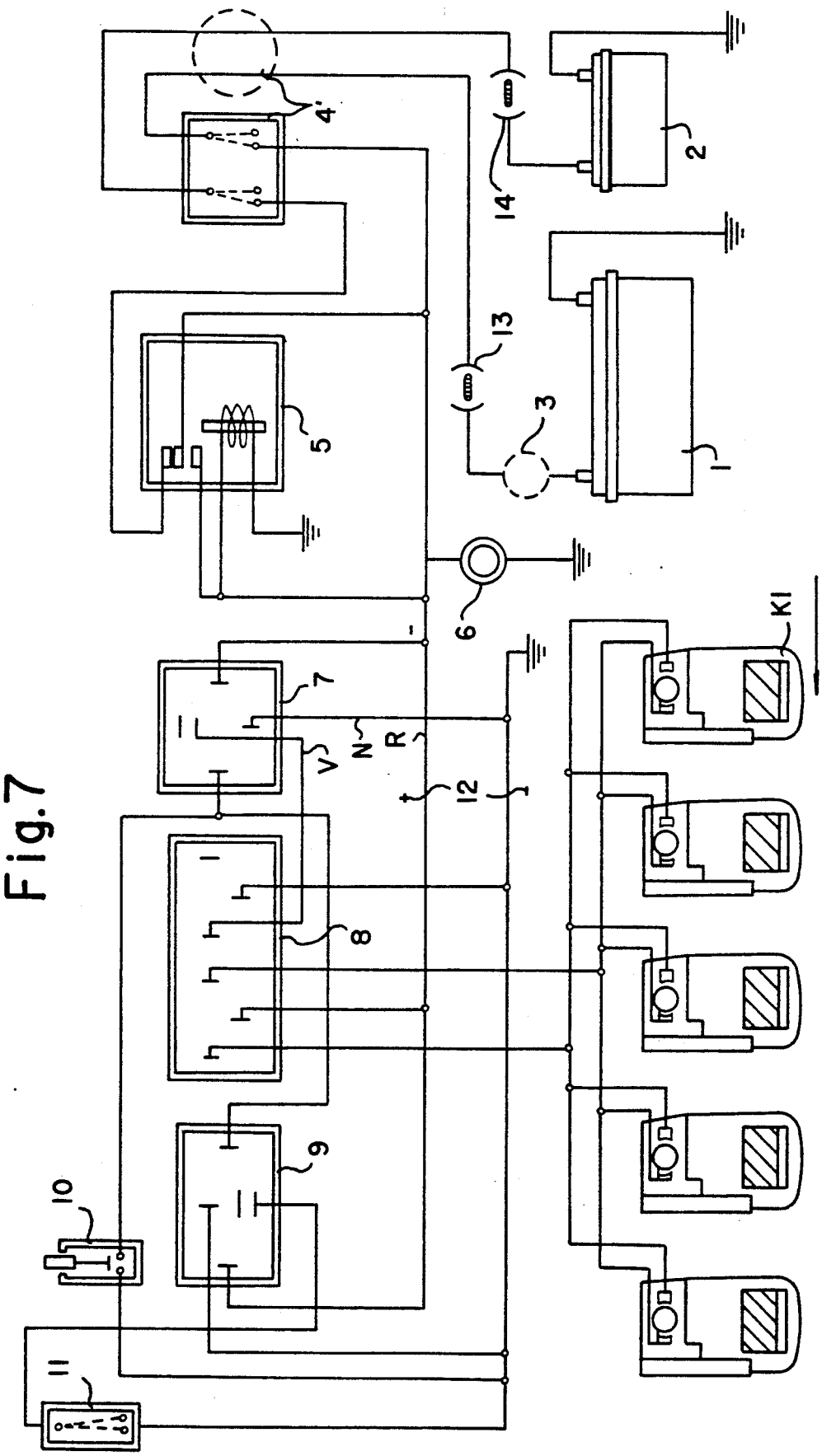

FIG. 6 describes a device feature;

FIG. 7 table 2 is a complete scheme, which is preferred but not exclusive, showing the electronic connection system from the batteries with the gear contained in the coupling buckles of the safety belts quick-release previously mentioned.

Figure 4:
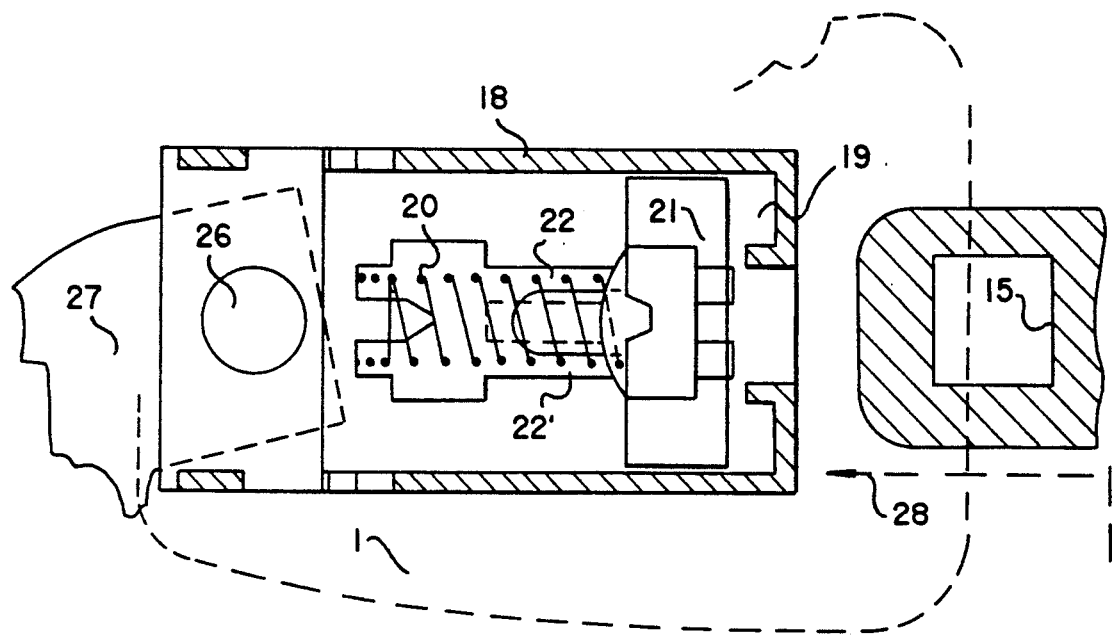
Figure 5:
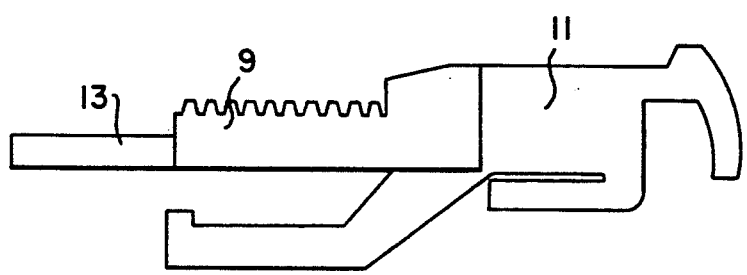
FIG. 5 is a side view of the coupling buckle button.

In the figures similar reference numbers are used to indicate the corresponding parts. The electromechanical device contained in the box-shaped shell of the coupling buckle 1 FIG. 4, consists of a Kinematisms system tripped by a trigger box (2), charged by the vehicle battery or by the small vehicle standby battery (3-4) FIG. 7. On the motor shaft is adjusted a cogwheel (5), connected with an underdrive consisting of a wheel with two toothed sections (6-7), free to wheel on the shaft (8); the mating of section (7) with a toothed rectilineal small bar (9), enables a rectilineal shifting B-A (10), that is the movable part consisting of the whole coupling buckle button (11) interlock. An antagonist spring, (12), engaged into the front section, (13) and strongly attached inside the casing (14),. works in order to bring the button back to the start position right after the electronic tripping of the safety belt quick-release. This peculiar belt clutch feature, which is mostly appreciated, uses an element with a terminal holed plate housing (15), into which a lever crook consisting of a steel plate is engaged (16), together with the appendix fulcrum (17-17') housed inside the buckle steel framework (18). The belt coupling, see arrow (28), is obtained by inserting into the framework housing (19), the terminal element (15), which by pressing a cylindrical antagonist spring (20) and a supporting guide 21, sliding inside the terminal holed plate housings (22-22'), of the framework (18), causes at a certain moment, the depression of level (16), inside which, viz. the upper section of the crook (16), works a compression spring (23), which by pressing with rectilineal sliding, (24), a moving steel disc (25), helps to couple and block the belt terminal element (15). The safety belt quick-release in question can be obtained either electronically or manually by simple pressing button II of the belt coupling buckle I.

You have to consider the peculiarity that the belt quick-release electronic circuit can be controlled manually. Such feature is appreciated for the driver's comfort and for the passengers when getting out of the vehicle; as a matter of fact just press the contact breaker of the system located on the dashboard and here we are—all belts are released simultaneously all of a sudden. The mechanical device consisting of a pilot motor (2), a toothed wheel (6-7), and of the peculiar button II including the toothed section (9), can be connected with the best homologated safety belts on the market. Since this peculiarity is appreciated, but it is not exclusive, the coupling is obtained by using the framework (18) tightening pin (26) with the terminal element of the clamp (27), set or flexible.

As to the electronic circuit for the safety belt automatic quick-release in question, see the system scheme, to be considered as a non-limited example, Table 2, where it avails itself of a double charge both through the vehicle main battery (1), and, in case of no-go of the same, through the small (12) volts standby battery (accumulator) (2), connection cables (colour R=red, N=black, V=violet) allow the connection with: a micro-contact breaker (4), opening drive of the system; a relay switch (5); a led light warning you about the correct system working (6); a control relay (7) of the micro-contact breaker (4) and of the 12 volts and 30 ampere trigger box for the K belts quick-release I; an instantaneous press-button switch (10); a vibrating contactor II; a 6/8" electronic timer switch (9); A-B-C-D-E cables are earth; two electric fuses (13-14) protect the whole system.

The whole electronic system works as follows: the vehicle is running, the driver and the passengers have the safety belts on them, the warning light (LED) (6) is on, all is OK. Suddenly the accident, a crash, the vehicle stops, even the motor, down to pieces, does not work any more; at the moment of the crash the circuit starts working. The press-button switch II, attached some place inside the vehicle body, when the crash happens, starts working immediately; it sends an electric impulse to the timer switch (9), which together with the control relay (7), sends an impulse to the trigger box (8) that, after 6-8" (seconds) from the crash, operates the safety belt automatic quick-release.

It is also possible to get the belt electronic quick-release by pressing button (10), which, by sending an impulse to relay (7), simultaneously sends the trigger box (8) the same impulse.

Moreover the electronic quick-release can be operated through the connection of the cables of the engine starter key on the check control, see dashing (3) and (4) Table 2.

The different electronic components on the scheme described as a non-limited or exclusive example, may be also widely modified, without invalidating this invention. The whole of the above mentioned components and the small standby battery are housed inside a single waterproofed container to be installed inside the vehicle compartment. Even the connection cable and the buckle box-shaped shell are waterproof in order to secure the correct belt working when the vehicle is unfortunately submerged by waters. We described how, by simple and cheap means, we succeeded in obtaining a really revolutionary safety belt which, by keeping effective the safety belts purpose to make the car driver and the passengers solid with the bodywork and by enabling them to endure a deceleration dissipating kinetic energy at the same time, is still very important to save human lives through automatic quick-release right some seconds after a serious car crash. Of course, considering the purpose of this invention construction and realization features can be widely modified in comparison with what was described up to this point, without invalidating this invention.

We claim:

1. A quick-release device for a vehicle seat belt latch comprising a buckle on one end of the seat belt having a latch therein to engage and retain a terminal plate on another end of a seat belt, means mounted on said buckle and connected mechanically to said latch for releasing said latch, a trigger box connected to said releasing means for actuating said releasing means, and means connected to said trigger box for generating an electrical impulse at a pre-determined time to energize said trigger box such that said releasing means is actuated.

2. A quick-release device as claimed in claim 1 and further comprising time delaying means connected to said electrical impulse generating means for transmitting said electrical impulse after a pre-determined time interval.

3. A quick-release device as claimed in claim 2 wherein said means for generating an electrical impulse is actuated in response to a sudden stop of the vehicle.

4. A quick-release device as claimed in claim 1 and further comprising a manually actuated button connected to said electrical impulse generating means to actuate the same.

5. A quick-release device as claimed in claim 1 wherein said releasing means comprises a rectilinearly movable member having a horizontally extending toothed rack, a reduction gear system meshing with said toothed rack, and a pilot motor energizable by an electrical impulse drivingly connected to said reduction gear system such that energization of said pilot motor actuates said rectilinearly movable member to release said latch.

* * * * *